Aug. 10, 1937.  A. HAAS  2,089,363
MACHINE TOOL
Filed May 23, 1936  4 Sheets-Sheet 1

INVENTOR
ALVIN HAAS
BY Robert F. Michler
ATTY.

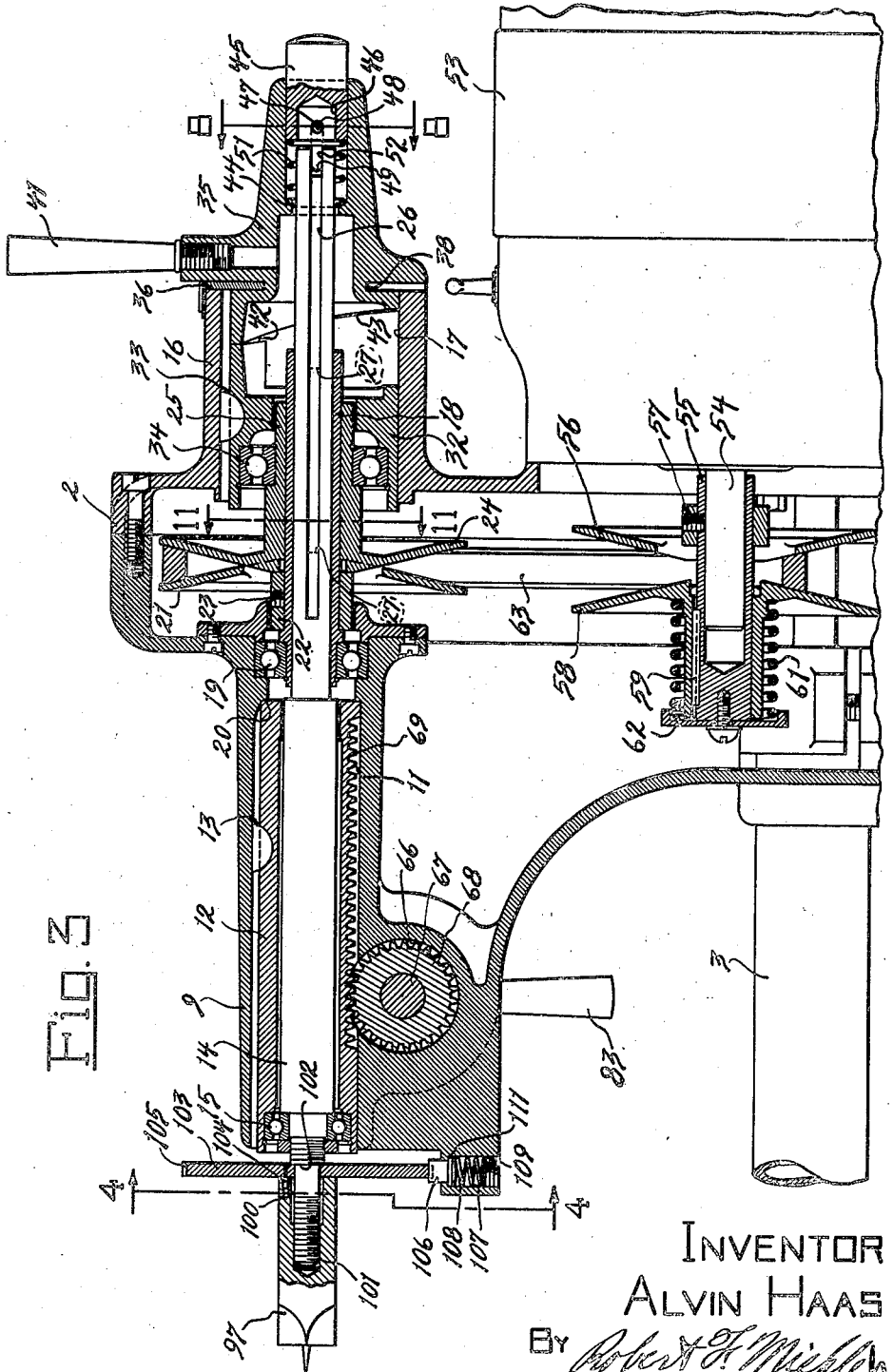

Aug. 10, 1937.  A. HAAS  2,089,363
MACHINE TOOL
Filed May 23, 1936  4 Sheets-Sheet 3
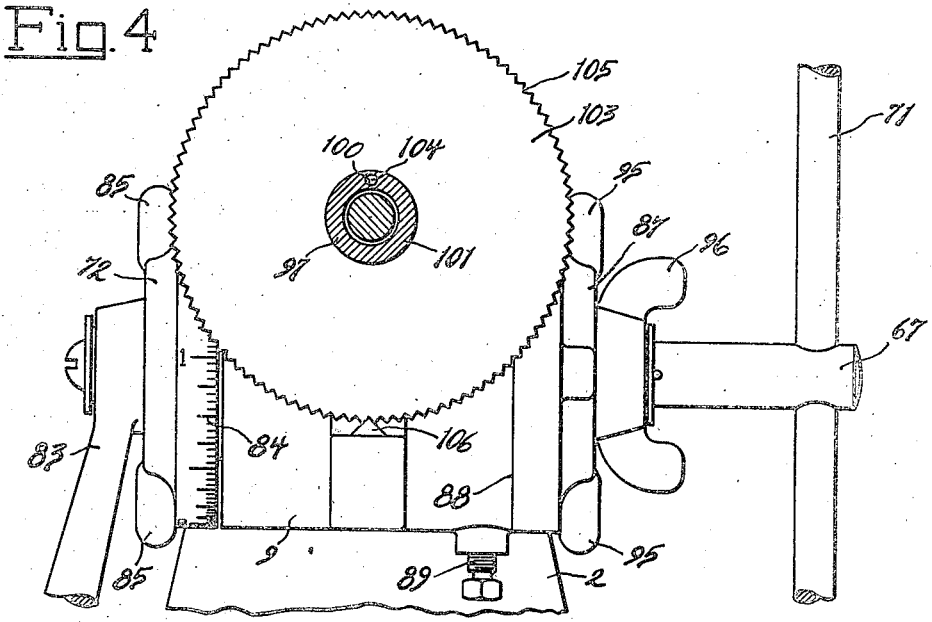
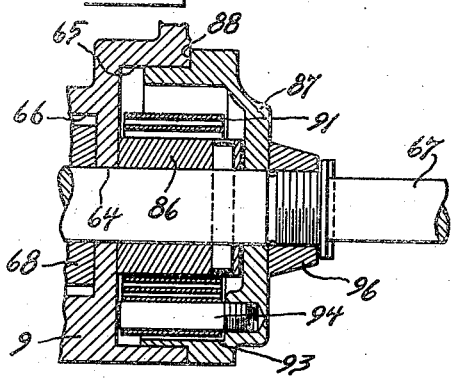
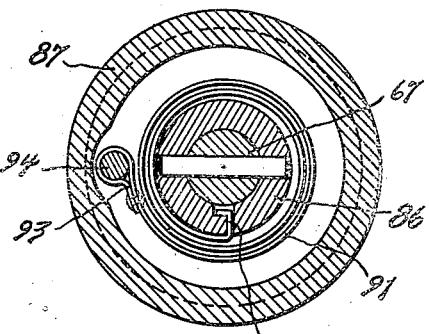
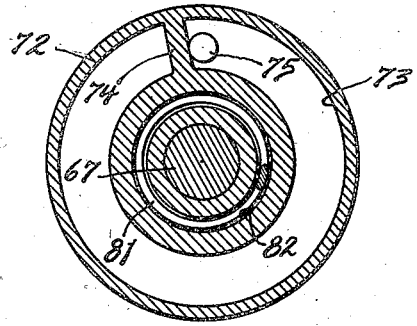
INVENTOR
ALVIN HAAS
BY Robert F. Mickle
ATTY.

Aug. 10, 1937.  A. HAAS  2,089,363
MACHINE TOOL
Filed May 23, 1936  4 Sheets-Sheet 4

INVENTOR
ALVIN HAAS
BY Robert F. Miehle, Jr.
ATTY.

Patented Aug. 10, 1937

2,089,363

UNITED STATES PATENT OFFICE 2,089,363

MACHINE TOOL

Alvin Haas, Peru, Ill.

Application May 23, 1936, Serial No. 81,495

14 Claims. (Cl. 29—27)

My invention relates particularly to wood working machines and more particularly to combination machine tools of the type described and claimed in my co-pending application, Serial No. 69,287, filed March 17, 1936, for improvement in Combination machine tool, although not limited to this use alone.

The invention contemplates a variable speed belt transmission and one feature resides in the provision of a novel and desirable variable diameter transmission pulley and adjusting mechanism therefor which is particularly adapted for multipurpose power heads, a related feature residing in a novel and desirable association of a rotatable and axially shiftable spindle, such as a work spindle, with a variable diameter transmission pulley and additionally a pulley control, particularly with a view toward the provision of a variable speed multi-purpose power head adapted for combination machine tools of the type described in the aforesaid application.

Other features reside in the provision of novel and desirable structures for controlling a spindle, such as a rotatable work spindle, particularly with a view toward the proper and convenient control of the work spindle of a multi-purpose power head adapted as aforesaid.

With these features in view my invention consists in certain features of novelty in the construction, combination, and arrangement of parts by which the said features and certain other features, hereinafter appearing, are effected, all as fully described with reference to the accompanying drawings and more particularly pointed out in the appended claims.

In the said drawings—

Figure 3 is a partial section of the power head substantially on the line 3—3 of Figure 2;

Figure 4 is a partial sectional view on the line 4—4 of Figure 3;

Figure 5 is a partial section substantially on the line 5—5 of Figure 2;

Figure 6 is a section substantially on the line 6—6 of Figure 2;

Figure 7 is a section substantially on the line 7—7 of Figure 2;

Figure 1:
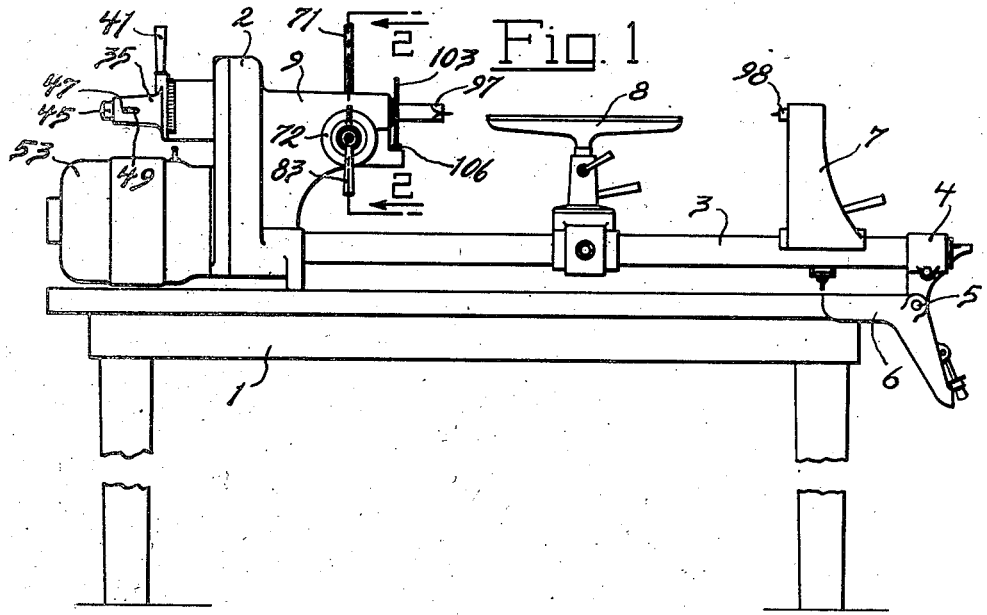
Figure 1 is a side elevation of a combination machine having a power head embodying my invention.

Referring to the drawings, 1 designates a work bench or table on which the combination machine of my aforesaid application is mounted. See Figure 1.

The power head embodies a hollow casing or frame 2, and this head is provided with an extending bed or support 3. A pivot member 4 is secured on the bed or support 3 remote from the power head, and this pivot member is pivoted at 5 to a second pivot member 6 which is secured at one end of the bench or table 1, to the end that the machine may be positioned in a horizontal position as shown in Figure 1, for such uses as that of a lathe, or in a vertical position, not shown, for such uses as that of a drill press, suitable means being provided for securing the machine in vertical position, all as fully described and claimed in my application aforesaid.

As shown in Figure 1, a tail stock 7 is detachably mounted on the bed or support 3, and a tool rest 8 is likewise detachably mounted on the bed or support, to the end that the machine serves as a lathe.

Figure 2:
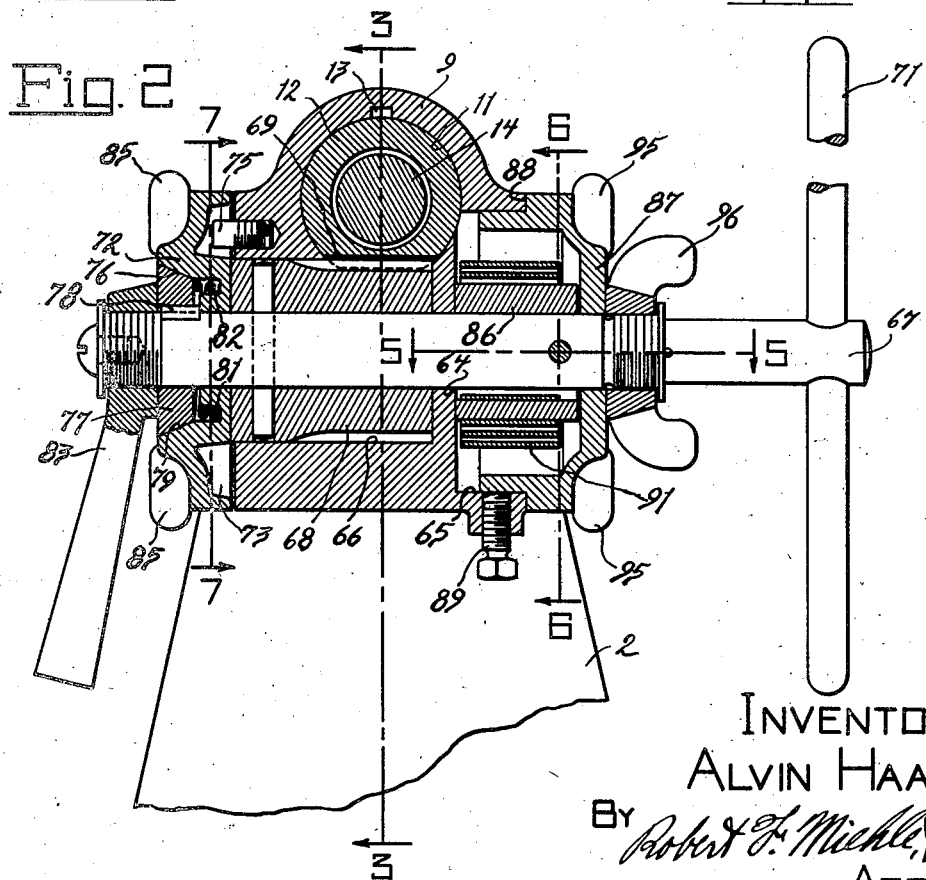
Figure 2 is an enlarged section substantially on the line 2—2 of Figure 1.

The casing or frame 2 is provided with a forward extension 9 which is provided with a bore 11 disposed in parallelism with the bed or support 3, and a tubular member or quill 12 is slidably engaged in the bore 11, the quill being slidably keyed with the extension 9, as designated at 13, to prevent rotation of the quill. See Figures 2 and 3.

A work spindle 14 extends through the bore of the quill 12, and a radial and thrust ball bearing 15 within the outer end of the quill and between it and the spindle serves to support the corresponding end of the spindle for rotation and to axially fix the spindle with the quill, so that axial movement of the quill effects axial movement of the spindle.

The spindle 14 extends inwardly from the quill 12 through the main portion of the casing 2 and through a rear extension 16 thereof, the extension 16 being provided with a relatively large bore 17 disposed coaxially with the bore 11 and the spindle.

A bored sleeve 18 is slidably engaged on the spindle 14, and the end of this sleeve adjacent the quill 12 is supported for rotation and is axially fixed by a radial and thrust ball bearing 19 within the bore 11, a reduced portion of the bore 11 adjacent the bearing 19 forming a shoulder 20 which serves to limit inward movement of the quill.

A rearwardly facing bored sheave member 21 has its bore engaged on the sleeve 18 and is provided with a forwardly extending bored hub 22 which is secured with the sleeve by a set screw 23, the sleeve 18 thus, in effect, providing a bored hub for this sheave member, which hub extends in both directions from the sheave member and through which the spindle 14 passes.

A forwardly facing bored sheave member 24 opposes the sheave member 21 and has its bore slidably engaged on the sleeve 18, and is provided with a rearwardly extending bored hub 25 which together with the sleeve 18 extends into the bore 17 of the rear extension 16.

Figure 10:
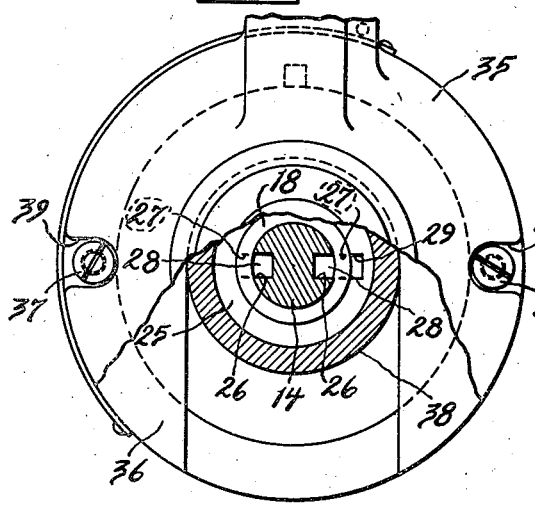
Figure 10 is a partial rear end elevation of the aforesaid power head with parts broken away and shown in section.

The rear portion of the spindle 14 is provided with diametrically opposite keyways 26, and the sleeve 18 is provided with diametrically opposite key slots 27 terminating inwardly of the ends of the sleeve. See Figures 3, 10 and 11. Keys 28 are engaged in the key slots 27 and are slidably engaged in the spindle keyways 26, so that the spindle 14 is angularly fixed with the sleeve 18 and is axially movable independently of the sleeve and sheave members, the ends of the key slots 27 retaining the keys 28 axially of the sleeve.

Figure 11:
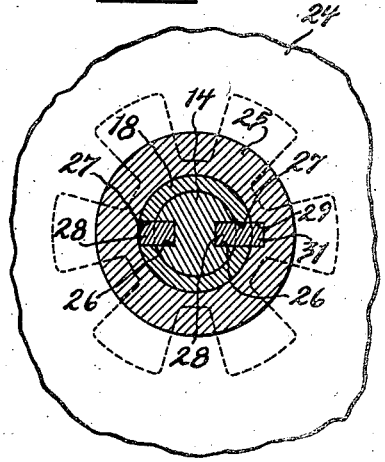
Figure 11 is a partial section on the line 11—11 of Figure 3.

The bore of the sheave member 24 is provided with a keyway 29, and one of the keys 28 is extended outwardly of the sleeve 18, as designated at 31 in Figure 11, and slidably engages in the keyway 29, thus angularly fixing the sheave member 24 with the sleeve 18 and the spindle 14 while permitting axial movement of this sheave member relative to the sheave member 21 and the spindle 14.

A relatively large sleeve 32, through the bore of which the spindle 14 passes, is slidably engaged in the bore 17 of the extension 16 and is slidably keyed therein, as designated at 33, to prevent angular movement thereof. A radial and thrust ball bearing 34 within the sleeve 32 and between this sleeve and the hub 25 serves to support this hub and the corresponding end of the sleeve 18 and to axially fix the sleeve 32 and the sheave member 24 so that axial movement of the sleeve 32 effects axial movement of this sheave member.

A concentrically bored member 35 is engaged for rotation in the rear portion of the bore 17 of the rear extension 16, and a segment shaped thrust plate 36 is secured against the rear face of the extension 16 by means of screws 37 and engages in an intermediate circumferential groove 38 on the member 35 to form a thrust bearing therefor. See Figures 3 and 10.

The member 35 is enlarged immediately to the rear of the thrust plate 36 and is provided with peripheral notches 39 for the insertion and removal of the screws 37, and this enlarged portion of the member 35 is provided with a radially disposed handle 41 for the angular manipulation of the member 35.

Figure 12:
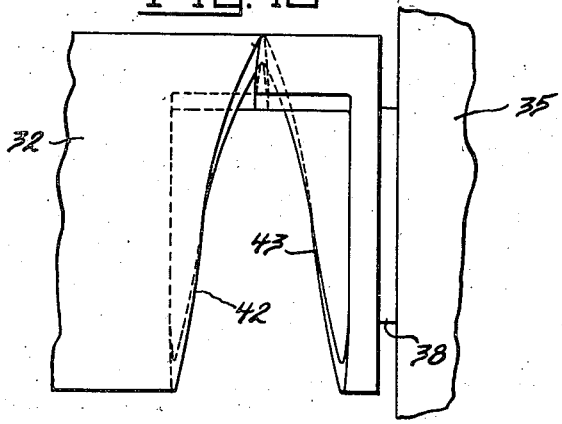
Figure 12 is a partial side elevation of certain parts of the structure hereinafter described.

The rear end of the sleeve 32 is in the form of an axially facing cam 42 and the adjacent end of the member 35 is provided with a similarly inclined axially facing cam 43 engageable with the cam 42, so that angular movement of the member 35 in one direction causes the sleeve 32 to move forwardly and with it the sheave member 24, the sheave member 24 and the sleeve 32 being caused to move rearwardly with angular movement of the member 35 in the opposite direction in a manner hereinafter described. See Figures 3 and 12.

The bore of the member 35, which is concentric with the spindle 14 and into which this spindle passes, is provided with an intermediate reduced portion forming a rearwardly facing shoulder 44. See Figures 3 and 9. A plunger 45 is slidably mounted in the rear portion of the bore of the member 35 and is provided with a bore 46 extending from the inner end thereof and into which the rear end of the spindle 14 may extend.

Figure 8:
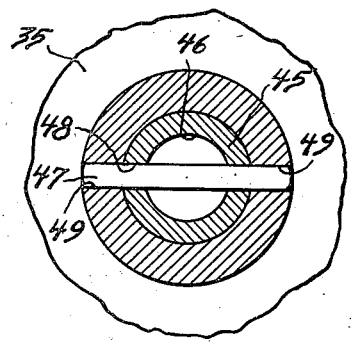
Figure 8 is a section substantially on the line 8—8 of Figure 3.

A pin 47 extends through and is fixed in a transverse bore 48 through the plunger 45 at the bored portion thereof, and is slidably engaged in slots 49 in the member 35, so that the plunger is fixed against rotation relative to the member 35 and is limited as to axial movement. See Figures 3, 8 and 9. A compression spring 51 within the bore of the member 35 reacts on the shoulder 44 and yieldably urges the plunger 45 to its rearward or inoperative position.

Figure 9:
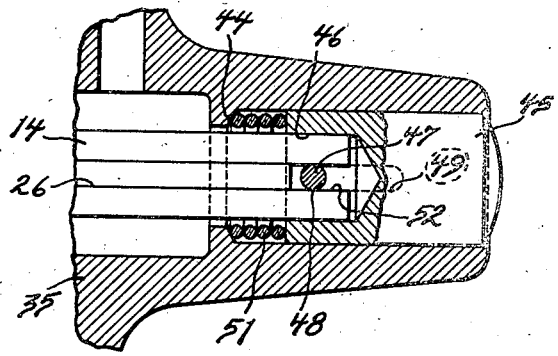
Figure 9 is a partial section similar to Figure 3 showing parts in positions different than those in which they are shown in Figure 3.

The rear end of the spindle 14 is provided with a diametrical slot 52, and, when this spindle is in its rear position, the rear end portion thereof lies adjacent the plunger 45. In this position of the spindle, forward or inward movement of the plunger 45 causes the bore 46 to engage over the spindle and the pin 47 to engage in the slot 52, as shown in Figure 9, thus locking the spindle against rotation for the screwthreaded mounting and dismounting of various devices on the forward end of the spindle as hereinafter described, the spring 51 serving to release the spindle upon release of the plunger as shown in Figure 3.

Mounted on the casing or frame 2 in parallelism with the spindle 14 and in the region of the bed or support 3, is an electric motor, generally designated at 53, and the shaft 54 of the motor projects into the enclosure of the casing or frame. See Figures 1 and 3.

A bored extension shaft 55 is engaged on the projecting portion of the motor shaft 54, and a forwardly facing bored sheave member 56 is engaged on the rear portion of the extension shaft. A set screw 57 serves to secure this sheave member, the extension shaft 55 and the motor shaft 54 together.

A rearwardly facing bored sheave member 58 is slidably keyed, as designated at 59, on the forward portion of the extension shaft 55 and opposes the sheave member 56. A compression spring 61 encircles the hub of the sheave member 58, and, reacting on a disk 62 secured on the forward end of the extension shaft 55, yieldably urges the sheave member 58 rearwardly toward the sheave member 56.

The opposing faces of the sheave members 21 and 24 and the opposing faces of the sheave members 56 and 58 are of convex taper, and a V-belt 63 is trained over the pulleys or sheaves formed thereby.

The spring 61 acting through the belt 63 yieldably urges the sheave member 24 rearwardly in opposition to the cams 42 and 43, so that angular adjustment of the member 35 in either direction acts on the pulleys or sheaves to vary their diameters for speed variation.

Axial movement of the quill 12 and with it the spindle 14 is controlled in the following manner:

The forward extension 9 is provided with a bore extending therethrough on an axis transverse to and to one side of the bore 11 and communicating therewith. This bore consists of small intermediate bore portion 64, a relatively large bore portion 65 at one side of the portion 64 and a bore portion 66 of intermediate size at the other side of the portion 64 and communicating with the bore 11. See Figures 2 and 3.

A shaft 67 extends through the bore consisting of the portions 64, 65 and 66 and is journaled for angular movement in the bore portion 64. A gear pinion 68, disposed within the bore portion 66, is secured on the shaft 67 and meshes with a gear rack 69 formed on the quill 12, so that angular movement of this shaft effects longitudinal movement of the quill and with it the spindle 14. A T-handle 71 is mounted on one end of the shaft 67 for the manual actuation thereof.

Inward movement of the quill 12 and spindle 14 is limited by the shoulder 20 as hereinafter described, and outward movement of the quill and spindle is limited by an adjustable stop device now to be described. See Figures 2 and 7.

A bored member 72 is mounted for angular movement on the shaft 67 adjoining the outer end of the pinion 68 and is engageable thereagainst. The inner face of the member 72 is provided with a circular recess 73 which is interrupted by a radial rib 74 forming a stop. A stop stud 75 is mounted on the extension 9 and, projecting into the recess 73, is engageable by the stop 74 to limit angular movement of the member 72.

The outer face of the member 72 is provided with an outwardly facing concentric internal frusto conical friction surface 76, and a bored clutch member 77 is slidably keyed, as designated at 78, on the shaft 67 outwardly of the member 72 and is provided with an inwardly facing concentric external frusto conical friction surface 79 engageable with the surface 76. A compression spring 81, engaged in a circular recess 82 on the member 72, yieldably urges the clutch member outwardly out of engagement with the member 72.

A handle nut 83 is screwthreaded on the shaft 67 outwardly of the clutch member 77 and, acting on the clutch member, serves for engaging and releasing the friction surfaces 76 and 79 for adjustably fixing the member 72 angularly on the shaft 67 to adjustably limit outward movement of the quill 12 and the spindle 14. The member 72 is provided with a peripheral index scale 84 for predetermining adjustment of the member 72 and the shaft 67, and is provided with wings 85 for the convenient manipulation thereof.

A hub 86 is secured on the shaft 67 and extends into the bore portion 65, and a cup-shaped and bored member 87 has its bore engaged on the shaft 67 outwardly of the hub 86 and has its lip externally reduced to engage for angular movement in the bore portion 65 and to form a shoulder 88 having an inward thrust bearing engagement with the extension 9. See Figures 2, 5 and 6. A set screw 89 serves to fix the member 87 in angularly adjusted position with the extension 9.

A torsional coil spring 91 is disposed within the enclosure formed by the bore portion 65 and the member 87, and, encircling the shaft 67 and hub 86, has its inner end secured with the hub 86, as designated at 92. The outer end of the spring 91 is secured, as designated at 93, to a stud 94 mounted on the member 87.

The spring 91 serves to counterbalance the quill 12 and spindle 14 when the machine is in vertical position, and is adjustable by adjustably fixing the reaction member 87 angularly by means of the set screw 89, the member 87 being provided with wings 95 for the convenient manipulation thereof.

A wing nut 96 is screwthreaded on the shaft 67 outwardly adjoining the member 87 for the purpose of frictionally locking the shaft 67 and with it the quill 12 and spindle 14 in a desired position.

Primarily, the longitudinal movement of the spindle 14 is for the purpose of use of the machine as a drill press. However, it is obvious that where the machine is used as a lathe, the longitudinal movement of the spindle may be utilized for the mounting of work between a drive center 97 on the forward end of the spindle 14 and a center 98 on the tail stock 7, the wing nut 96 serving to lock the spindle 14 in the desired position.

The forward end of the spindle 14 projects from the quill 12 and is reduced and screwthreaded, as designated at 101, and forms a shoulder 102 disposed inwardly of and facing in the direction of the forward end of the spindle.

The drive center 97 is bored and is detachably screwthreaded on the end 101, the plunger 45 serving to lock the spindle for the purpose of mounting and dismounting of the drive center or other devices with reference to the spindle 14.

For the purpose of indexing the spindle 14, say for fluting work, the following is provided. See Figures 1, 3 and 4.

A bored index disk 103 is detachably engaged on the reduced end 101 of the spindle 14 and against the shoulder 102, and the drive center 97, in its screwthreaded engagement on the reduced end 101, serves to engage the index disk against the shoulder 102. The index disk is provided with a forwardly projecting pin 104 which engages into a bore 100 in the rear end of the drive center 97 to angularly fix the drive center and the index disk.

The periphery of the index disk 103 is provided with index teeth 105 equally spaced angularly thereabout. A plunger 106 is mounted in a bore 107 in the extension 9 for movement radially of the spindle 14 and is engageable with the teeth 105 to index the drive center. A compression spring 108, in the bore 107 and reacting on a plug 109 screwthreaded in this bore, yieldably urges the plunger into engagement with the teeth 105 for indexing. The plunger has a shoulder engagement 111 with the bore 107 to limit movement of the plunger toward the axis of the spindle. The engagement of the plunger 106 with the teeth 105 is such that the plunger will disengage and re-engage the teeth with excess angular pressure on the disk, thus providing for convenient indexing. Obviously, the index disk is removed when it is desired to drive the spindle 14, as for turning or drilling.

Having thus described my invention, I do not wish to be limited to the precise details described as changes may be readily made without departing from the spirit of my invention, but having thus described my invention, I claim as new and desire to secure by Letters Patent the following:

1. In a device of the character described, the combination with a rotatable axially shiftable spindle, of a variable diameter transmission pulley comprising opposing bored pulley members one of which is provided with a bored hub into the bore of which said spindle slidably engages and the other pulley member of which is also provided with a bored hub slidably engaged on said first mentioned hub, and a driving key engaged in a slot through said first mentioned hub and slidably engaged in keyways in said spindle and said second mentioned hub.

2. In a device of the character described, the combination with a rotatable axially shiftable spindle, of a variable diameter transmission pulley comprising opposing bored pulley members one of which is provided with a bored hub extending in both directions therefrom and through the bore of which said spindle passes and the other pulley member of which is provided with a bored hub slidably engaged on one portion of said first mentioned hub, a radial and thrust bearing associated with the other portion of said first mentioned hub, and pulley adjusting means including a bored member through the bore of which said spindle extends and mounted for movement axially of said pulley and a radial and thrust bearing between said second mentioned hub and said bored member.

3. In a device of the character described, the combination with a rotatable axially shiftable spindle, of a variable diameter transmission pulley comprising opposing bored pulley members one of which is provided with a bored hub extending in both directions therefrom and through the bore of which said spindle passes and is slidably keyed and the other pulley member of which is provided with a bored hub slidably keyed on one portion of said first mentioned hub, a radial and thrust bearing associated with the other portion of said first mentioned hub, and pulley adjusting means including a sleeve through the bore of which said spindle extends and mounted for movement axially of said pulley and a radial and thrust bearing between said second mentioned hub and said sleeve.

4. In a device of the character described, the combination with a variable diameter transmission pulley, of a stationary part provided with a bore disposed correspondingly with the axis of said pulley, an adjusting member slidably enengaged in said bore and angularly fixed with said stationary part for adjusting said pulley, a control member mounted for angular movement on the axis of said bore, and motion converting means operative between said adjusting and control members for axially adjusting said adjusting member with angular movement of said control member.

5. In a device of the character described, the combination with a variable diameter transmission pulley, of a stationary part provided with a bore disposed substantially coaxial with the axis of said pulley, an adjusting member slidably engaged in said bore and angularly fixed with said stationary part for adjusting said pulley, a control member engaged in said bore for angular movement, thrust bearing means fixing said control member axially of said bore, and axial cam means within said bore and operative between said adjusting and control members for axially adjusting said adjusting member with angular movement of said control member.

6. In a device of the character described, the combination with a variable diameter transmission pulley, of a stationary part provided with a bore substantially coaxial with the axis of said pulley, an adjusting member slidably engaged in said bore and angularly fixed with said stationary part for adjusting said pulley, a control member engaged in one end of said bore for angular movement, a segment shaped thrust member secured to said stationary part at said end of said bore and engaged in a circumferential groove on said control member to form a thrust bearing therefor, and axial cam means within said bore and operative between said adjusting and control members for axially adjusting said adjusting member with angular movement of said control member.

7. In a device of the character described, the combination with a frame member provided with a bore and an enlarged bore adjoining said first mentioned bore and concentric therewith, of an angularly movable spindle shifting shaft extending through said bores, a torsional coil spring encircling said shaft in the region of said enlarged bore and operatively connected with said shaft for yieldably urging the same in one direction, an angularly movable cup-shaped and bored reaction member operatively connected with said spring to take the reaction thereof and through the bore of which said shaft extends, the lip of said reaction member having a bearing engagement with said enlarged bore, said enlarged bore and said reaction member cooperating to enclose said spring, and releasable means for securing said reaction member with said frame in angularly adjusted position.

8. In a device of the character described, the combination with a frame member provided with a bore, of an angularly movable spindle shifting shaft extending through said bore, a torsional spring encircling said shaft and operatively connected with said shaft for yieldably urging the same in one direction, an angularly movably bored reaction member operatively connected with said spring to take the reaction thereof and through the bore of which said shaft extends and having a thrust bearing engagement with said frame member, releasable means for securing said reaction member with said frame member in angularly adjusted position, and a second releasable means for securing said shaft against angular movement including a member screwthreaded on said shaft for exerting pressure against said reaction member in the direction of said thrust bearing engagement.

9. In a device of the character described, the combination with a frame member provided with a bore and an enlarged bore adjoining said first mentioned bore and concentric therewith, of an angularly movable spindle shifting shaft extending through said bores, a torsional coil spring encircling said shaft in the region of said enlarged bore and operatively connected with said shaft for yieldably urging the same in one direction, an angularly movable cup shaped and bored reaction member operatively connected with said spring to take the reaction thereof and through the bore of which said shaft extends, the lip of said reaction member having a radial bearing engagement with said enlarged bore and a thrust bearing engagement with said frame member associated with said radial bearing engagement, said enlarged bore and said reaction member cooperating to enclose said spring, releasable means for securing said reaction member with said frame member in angularly adjusted position, and a second releasable means for securing said shaft against angular movement including a member screwthreaded on said shaft for exerting pressure against said reaction member in the direction of said thrust bearing engagement.

10. In a device of the character described, the combination with a spindle shifting shaft and a frame member carrying the same for angular movement relative thereto, of stop means operative between said shaft and frame member including a bored stop member engaged on said shaft for angular movement relative thereto and provided with an axially facing friction surface, a bored friction clutch member angularly fixed on said shaft and axially movable with reference thereto to frictionally engage and disengage said friction surface, and a member screwthreaded on said shaft for clamping and releasing said clutch member with reference to said friction surface.

11. In a device of the character described, the combination with a spindle shifting shaft and a frame member carrying the same for angular movement relative thereto, of stop means operative between said shaft and frame member including a bored stop member engaged on said shaft for angular movement relative thereto and provided with a concentric frusto conical friction surface, a bored clutch member angularly fixed on said shaft and axially movable with reference thereto and provided with a concentric frusto conical friction surface engageable with said first mentioned friction surface, spring means operative to disengage said friction surfaces, and a member screwthreaded on said shaft and axially operative upon said clutch member in opposition to said spring means for engaging and releasing said friction surfaces.

12. In a device of the character described, the combination with a rotatable spindle provided with a clutch formation at one end, of a relatively stationary part provided with a bore extending correspondingly with said spindle, and spindle locking means slidably engaged in said bore and angularly fixed with said stationary part and provided with a clutch formation engageable and disengageable with said first mentioned clutch formation in the movement of said locking means.

13. In a device of the character described, the combination with a rotatable spindle provided with a diametrical slot at one end, of a relatively stationary part provided with a bore extending coaxially with said spindle, a plunger slidably engaged in said bore and provided with an axially bored end portion engageable over said end of the spindle, a pin extending through a transverse bore through said plunger at the bored portion thereof and slidably engaged in a slot in and extending longitudinally of said bore of said stationary part, said pin being adapted to engage said slot of the spindle in one position of said plunger, and a compression spring in said bore of said stationary part and encircling said spindle and yieldably urging said plunger in the direction away from said spindle end.

14. In a device of the character described, the combination with a rotatable spindle, of a variable diameter transmission pulley provided with a bore through which said spindle extends, a driving connection between said pulley and spindle, a stationary part provided with a bore disposed coaxial with the axis of said pulley, means for adjusting said pulley including a control member mounted on said stationary part for angular movement on the axis of the bore of said stationary part, and a spindle locking device mounted on said control member and adapted to be selectively engaged with said spindle for locking the same against rotation.

ALVIN HAAS.